United States Patent [19]

Duvdevani

[11] 4,313,867

[45] Feb. 2, 1982

[54] LOW PRESSURE INJECTION MOLDABLE COMPOSITIONS

[75] Inventor: Ilan Duvdevani, Leonia, N.J.

[73] Assignee: Exxon Research & Engineering Co., Florham Park, N.J.

[21] Appl. No.: 222,615

[22] Filed: Jan. 5, 1981

[51] Int. Cl.³ .................................................. C08L 91/00
[52] U.S. Cl. ...................... 260/33.6 AQ; 260/33.6 A; 260/33.6 UA; 260/42.46; 260/42.47; 260/DIG. 31; 525/97
[58] Field of Search ............. 260/33.60 UA, 33.6 PQ, 260/33.6 AQ, DIG. 31, 42.46, 42.47; 525/97

[56] References Cited

U.S. PATENT DOCUMENTS

| | | | |
|---|---|---|---|
| 3,642,728 | 2/1972 | Canter | 525/331 |
| 3,689,595 | 9/1972 | Gwinn | 525/89 |
| 3,974,241 | 8/1976 | Lundberg | 525/97 |
| 4,032,492 | 7/1977 | Englund et al. | 260/28.5 A |
| 4,076,669 | 2/1978 | Harper | 260/33.6 AQ |
| 4,107,130 | 8/1978 | Gergen et al. | 260/42.47 |
| 4,122,131 | 10/1978 | Bussink et al. | 260/42.47 |
| 4,127,546 | 11/1978 | Lundberg et al. | 260/33.6 AQ |
| 4,132,698 | 1/1979 | Gessler et al. | 260/33.6 AQ |
| 4,136,699 | 1/1979 | Collins et al. | 260/33.6 AQ |
| 4,151,137 | 4/1979 | Duvdevani et al. | 260/DIG. 31 |
| 4,160,751 | 7/1979 | Bock et al. | 260/42.47 |
| 4,169,820 | 10/1979 | Bock | 260/42.47 |
| 4,179,422 | 12/1979 | Makowski et al. | 260/42.47 |
| 4,187,206 | 2/1980 | Brenner | 260/33.6 AQ |

FOREIGN PATENT DOCUMENTS

| | | |
|---|---|---|
| 1307 | 4/1979 | European Pat. Off. |
| 1271760 | 4/1972 | United Kingdom |
| 1532350 | 11/1978 | United Kingdom |
| 2001657 | 2/1979 | United Kingdom |

*Primary Examiner*—Herbert J. Lilling
*Attorney, Agent, or Firm*—Richard E. Nanfeldt

[57] ABSTRACT

This invention relates to injection moldable type elastomeric compositions having improved physical and rheological properties. The compositions used for elastomeric articles include a styrene-ethylene/butylene-styrene block copolymer or compounds thereof, a neutralized sulfonated EPDM terpolymer and a non-polar process oil; and optionally a polypropylene thermoplastic resin.

These blend compositions can be readily processed due to their superior rheological properties on conventional plastic fabrication equipment, especially on low pressure injection molding equipment into elastomeric articles having excellent physical properties and desirable rubbery characteristics.

12 Claims, No Drawings

LOW PRESSURE INJECTION MOLDABLE COMPOSITIONS

FIELD OF THE INVENTION

This invention relates to injection moldable type elastomeric compositions having improved physical and rheological properties. The compositions used for elastomeric articles include a styrene-ethylene/butylene-styrene block copolymer or compounds thereof, a neutralized sulfonated EPDM terpolymer and a nonpolar process oil; and optionally a polypropylene thermoplastic resin.

These blend compositions can be readily processed due to their superior rheological properties on conventional plastic fabrication equipment, especially on low pressure injection molding equipment into elastomeric articles having excellent physical properties and desirable rubbery characteristics.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer having substantially improved physical properties over an unsulfonated elastomer at room temperature. However, these ionically cross-linked elastomers may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of this patent are readily usable in a certain number of limited applications, they are not as readily adaptable for the manufacture of an injection moldable elastomeric article such as footwear as are the improved compositions of the present invention, wherein both improved physical and rheological properties are realized. Although U.S. Pat. No. 3,642,728 refers generally to the blending of sulfonated EPDM terpolymers with unsulfonated elastomers, it does not contemplate or envision the use of a Kraton rubber in conjunction with a polypropylene thermoplastic resin.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process are not as suitable for the manufacture of high performance elastomeric articles such as footwear formed by an injection molding process as are the compositions of the present invention.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the compositions of the present invention are more adaptable for use in the manufacture of high performance elastomeric articles.

Products resulting for the aforementioned methods for obtaining neutralized sulfonated elastomeric compositions, possess either unsuitable rheological or physical properties for the applications envisioned in the present invention.

For example, the physical properties of these resultant sulfonated elastomeric products of these aforementioned patents are unsuitable for a major application of an injection molding process, namely the manufacture of footwear, wherein excellent resilience, dimensional stability, excellent low and high temperature flexibility, excellent flex fatigue, and excellent abrasion are needed. Furthermore, the high melt viscosity and melt elasticity of these materials makes injection molding difficult if not impossible. These materials of the aforementioned patents which are generally processable by only compression molding, have unsuitable physical properties for this major application of footwear.

U.S. Pat. Nos. 3,974,240 and 3,974,241 describe the blending of a crystalline polyolefinic material with a neutralized sulfonated elastomeric polymer in an attempt to improve both the rheological and physical properties of the elastomeric polymer. The selection of the use of the crystalline polyolefinic material to improve both the stiffness as well as improving the melt viscosity of the composition was based in part upon the limitation of the use of fillers such as carbon black, clays, calcium carbonate or silicates as a single additive to the elastomeric polymer. Although fillers in combination with an elastomeric polymer increase the hardness of the composition, these fillers deteriorate the melt viscosity of the resultant composition. These material are more adaptable for stiff elastomeric articles such as rubberized chair tips or wheels whereas the compositions of the present invention are more adapted for flexible elastomeric articles such as elastomeric footwear due to the blend of the Kraton, polypropylene thermoplastic resin and the sulfonated EPDM terpolymer.

The unique and novel improved compositions of the present invention overcome the deficiencies of the aforementioned U.S. Patents from both a rheological and physical properties aspect. The blend compositions of the present invention solve the problem of having a material which has both desirable rheological and physical properties for the manufacture of an elastomeric article as an elastomeric footwear, wherein the extrudate of the resultant compositions do not exhibit melt fracture during extrusion processing as in the case in some of the aforementioned patents.

SUMMARY OF THE INVENTION

It has been found surprisingly that compositions formed from blends of a neutralized sulfonated EPDM terpolymer, a styrene-ethylene/butylene-styrene block copolymer or compounds thereof (such as Kraton G) a non-polar process oil and optionally, a propylene thermoplastic resin have suitable rheological and physical properties for the formation of thermoplastic elastomeric article, by an injection molding or extrusion process.

Accordingly, it is an object of our present invention to provide unique and novel compositions of matter for producing a high performance elastomeric article by an injection molding or extrusion process, wherein the compositions of the elastomeric article have a viscosity at 0.73 sec$^{-1}$ at 200° C. of less than about $5.0 \times 10^6$ poises, and a Shore A Hardness of about 40 to about 90.

It is the object of the instant invention to describe a class of compounds based on sulfonated ethylene-propylene (EPDM) terpolymers which can be processed on plastics-type fabrication equipment at high rates and which possess improved physical characteristics such as abrasion, flexibility, rubbery feel, and improved high temperature properties. One of the essential aspects of the present invention is that only a restricted class of the subject sulfonated elastomers may be readily employed for low pressure injection molding fabrication. The restrictions are primarily associated with processing and product performance characteristics. These characteristics are to a degree modulated by the type of concentration of various compounding ingredients. The compositions of the instant invention will, therefore, involve a class of compositions based on a restrictive class of sulfonated EPDM terpolymers.

A substantial segment of the plastics and rubber fabrication industry employs a fabrication technique known as low pressure injection molding to form articles which can be classified as injection molded articles. An application employing this fabrication technique is elastomeric footwear which requires materials which are flexible and tough. Two broad classifications of materials which have been used are vulcanized elastomers and plasticized thermoplastics such as polyvinyl chloride (PVC). The fabrication of injection molded articles based on vulcanized elastomers is a major item of cost involving the vulcanization procedure. Not only is this step costly from an energy intensive viewpoint, but it is time consuming. The use of plasticizing injection molding equipment for thermoplastic materials is more economical and results in high production rates for materials such as plasticized PVC. While these materials possess a degree of flexibility, they do not have a good rubbery feel or good low temperature flexibility. It is therefore desirable to have materials which can be processed on plastics-type injection molding equipment at conventional plastics rates and which possess the flexibility and subjective rubbery characteristics of vulcanized elastomers.

GENERAL DESCRIPTION

This present invention relates to unique and novel blend compositions of a styrene-ethylene/butylene-styrene block copolymer and compounds thereof (such as Kraton G), a neutralized sulfonated EPDM terpolymer, a non-polar process oil, and optionally a polypropylene thermoplastic resin, wherein the resultant composition has a viscosity at 0.73 sec$^{-1}$ at 200° C. of less than about $5.0 \times 10^6$ poises and the compositions are readily processable in a conventional injection molding process into a high performance elastomeric article such as footwear. The resultant elastomeric article has excellent tensile properties and compression set, a rubber-like feel, and a Shore A Hardness of about 40 to about 90.

Various critically selected additives can be incorporated into the blend compositions such as an inorganic filler or a reinforcing filler for further modification of physical properties as well as rheological properties, a whitening pigment, a lubricant for improvement of the physical appearance such as shine of the finished footwear as well as the ability to easily eject the formed article from the mold during the injection molding process.

The neutralized sulfonated elastomeric polymers of this present instant invention are derived from unsaturated EPDM terpolymers.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 50 to about 70 wt. % ethylene, e.g. 50 wt. % and about 2.6 to about 8.0 wt. % diene monomer, e.g. 5.0 wt. %. The diene monomer is preferably a non-conjugated diene. Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 40 wt. % and a 5-ethylidene-2-norbornene content of about 5.0 wt. %. The $\overline{M}n$, as measured by GAC, of Vistalon 2504 is about 47,000, the $\overline{M}v$, as measured by GPC, is about 145,000 and the $\overline{M}w$, as measured by GPC, is about 174,000.

Another EPDM terpolymer, Vistalon 2504-20, is derived from V-2504 (Exxon Chemical Co.) by a controlled extrusion process, wherein the resultant Mooney viscosity at 212° F. is about 20. The $\overline{M}n$, as measured by GPC, of Vistalon 2504-20 is about 26,000, the $\overline{M}v$, as measured by GPC, is about 90,000 and the $\overline{M}w$, as measured by GPC, is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$), as measured by GPC, of about 10,000 to about 200,000, more preferably of about 15,000 to about 100,000, and most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$, as measured by GPC, of the EPDM terpolymer is preferably below about 350,000 and more preferably below about 300,000. The $\overline{M}w$, as measured by GPC, of the EPDM terpolymer is preferably below about 500,000 and more preferably below about 350,000.

In carrying out the invention, the EPDM terpolymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane, or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cyclo aliphatic alcohol such as cyclohexanol or with water. The unneutralized sulfonated elastomeric polymer has about 10 to about 100 meq. sulfonate groups per 100 grams of sulfonated EPDM terpolymer, more preferably about 15 to about 50, and most preferably about 20 to about 40. The meq. of sulfonate groups/100 grams of polymer is determined by both titration of the polymeric sulfonate and Dietert Sulfur analysis. In the titration of the sulfonate, the polymer is dissolved in solvent consisting of 95 parts of toluene and 5 parts of methanol at a concentration level of 50 grams per liter of solvent. The unneutralized sulfonate is titrated with ethanolic sodium hydroxide to an Alizarin Thymolphthalein endpoint.

The unneutralized sulfonated EPDM terpolymer is gel-free and hydrolytically stable. Gel is measured by stirring a given weight of polymer in a solvent comprised of 95 toluene/5 methanol at a concentration of 5 wt. % for 24 hours, allowing the mixture to settle, withdrawing a weighed sample of the supernatant solution and evaporating to dryness.

Hydrolytically stable means that the acid function in this case the sulfonic acid, will not be eliminated under neutral or slightly basic conditions to a neutral moiety which is incapable of being converted to highly ionic functionality.

Neutralization of the unneutralized sulfonated EPDM terpolymer is done by the addition of a solution of a basic salt to the unneutralized sulfonated EPDM terpolymer dissolved in the mixture of the aliphatic alcohol and non-reactive solvent. The basic salt is dissolved in a binary solvent system consisting of water and/or an aliphatic alcohol. The counterion of the basic salt is selected from antimony, aluminum, lead or Groups I-A, II-A, I-B or II-B of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the unneutralized sulfonated EPDM terpolymer to effect neutralization. It is preferable to neutralize at least 95% of the sulfonate groups, more preferably about 98%, most preferably 100%.

Examples of metal oxides useful in preparing metal sulfonates are MgO, CaO, BaO, ZnO, $Ag_2O$, $PbO_2$, and $Pb_2O_4$. Useful examples of metal hydroxides are NaOH, KOH, LiOH, $Mg(OH)_2$ and $Ba(OH)_2$.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity at 200° C. and at a shear rate of 0.73 sec$^{-1}$ (0.005 in/min) is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

In order to improve the rheological properties of the neutralized sulfonated EPDM terpolymer, a preferential plasticizer can be added to the neutralized sulfonated EPDM terpolymer at a concentration level of less than about 30 parts by weight per 100 parts by weight of the neutralized sulfonated EPDM terpolymer, more preferably about 2 to about 30, and most preferably about 4 to about 25. The preferential plasticizer is a metallic or ammonium salt of a carboxylic acid which has about 2 to about 30 carbon atoms, more preferably about 2 to about 24 carbon atoms. The metallic ion of the metallic salt of the carboxylic acid is selected from the group consisting of aluminum, lead, antimony, iron and Groups I-A, II-A, I-B and II-B of the Periodic Table of Elements. An especially preferred plasticizer for high temperature properties is zinc acetate.

The neutralized sulfonated EPDM terpolymer is blended with a styrene-ethylene/butylene-styrene block copolymer, a crystalline polypropylene thermoplastic resin and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch invensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer. Although styrene/butadiene/styrene block copolymers are contemplated, the preferred Kraton rubbers are block copolymers of styrene ethylene/butylene-styrene. The styrene-ethylene/butylene-styrene block copolymers useful in the instant invention are manufactured by Shell and are more generally referred to as Kraton G rubbers. The styrene-ethylene/butylene-styrene block copolymers have about 10 to about 50 weight % of styrene as end blocks. These styrene-ethylene/butylene-styrene block copolymers have a specific gravity of about 0.91, a Shore A Hardness as measured by ASTM-D-2240 of about 35 to about 90 and a tensile strength as measured by ASTM-D-412 of about 500 to about 7,000 psi. A styrene-ethylene/butylene-styrene block copolymer used in this invention is Kraton G-1650 (Shell) which has a tensile strength of 5,000 psi, a specific gravity of 0.91 and comprises 28 wt. % of styrene polymer blocks. A typical and useful Kraton thermoplastic rubber compound is Kraton G-2705 (Shell) which has a Shore A Hardness of about 60, a tensile strength of about 600 psi and a specific gravity of 0.90.

Thermoplastic resins useful in the instant blend compositions are isotactic polypropylene homopolymers which have an $\bar{M}n$ as measured by GPC of about 15,000 to about 150,000, a melt flow rate as measured by ASTM-D-1238 (condition L) of about 0.1 to about 50 grams/10 minutes, and a density as measured by ASTM-D-792 of about 0.90 grams/cc. A typical and useful isotactic polypropylene homopolymer is CD-460 (Exxon Chemical Co.) which has an $\bar{M}n$ of about 27,000, and a melt flow rate of about 20 grams/10 minutes, and a density of about 0.90 grams/cc.

The neutralized sulfonated EPDM terpolymer is incorporated into the blend composition at a concentration level of about 10 to about 400 parts by weight per 100 parts by weight of the styrene-ethylene/butylene-styrene block copolymer, more preferably about 15 to about 300, and most preferably about 20 to about 300. The isotactic polypropylene homopolymer is incorporated into the blend composition at a concentration level of about 5 to about 180 parts by weight per 100 parts by weight of the styrene-ethylene/butylene-styrene block copolymer, more preferably about 10 to about 150, and most preferably about 15 to about 120. The oils are incorporated into the blend compositions at a concentration level of about 5 to about 300 parts by weight per 100 parts by weight of the styrene-ethylene/butylene-styrene block copolymer, more preferably about 10 to about 250, and most preferably about 15 to about 250.

The oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at lease 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table I illustrates typical oils encompassed by the scope of this invention.

TABLE I

| Type Oil | Oil Code # | Viscosity ssu | Mn | % Polars | % Aromatic | % Saturates |
|---|---|---|---|---|---|---|
| Paraffinic | Sunpar 115 | 115 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Paraffinic | Tufflo 6056 | 495 | — | 0.0 | 0.9 | 99.1 |
| Naphthenic | Tufflo 6054 | 580 | — | 0.0 | 8.0 | 92.0 |

To the blend compositions can be optionally added a filler for further modification.

The fillers employed in the present invention are selected from talcs, ground calcium carbonate, water precipitated calcium carbonate, or delaminated, calcined or hydrated clays, amorphous hydrated silicas, and mixtures thereof. These fillers are incorporated into the blend composition at up to about 250 parts by weight per 100 parts by weight of the styrene-ethylene/butylene-styrene block copolymer, more preferably up to about 200 and most preferably up to about 160. Typically, these fillers have a particle size of about 0.01 to about 20 microns, more preferably about 0.05 to about 10, and most preferably about 0.1 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table II.

TABLE II

| Filler | Code # | Oil Absorption grams of oil/ 100 grams of filler | Specific gravity | Avg. Particle Size Micrometers | pH |
| --- | --- | --- | --- | --- | --- |
| calcium carbonate, ground | Atomite | 15 | 2.71 | 0.5–10 | 9.3 |
| calcium carbonate, precipitated | Purecal U | 35 | 2.65 | .03–.04 | 9.3 |
| calcium carbonate, precipitated | Dix-Glox-U | 50 | 2.65 | 0.05–0.1 | 11–12 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| magnesium silicate | Mistron Vapor | 60–70 | 2.75 | 2 | 9.0–7.5 |
| amorphous silica | I msil A-108 | 30 | 2.65 | 1.1 | 6.8–7.2 |
| amorphous silica | I msil A-10 | 30 | 2.65 | 1.55 | 6.8–7.2 |
| silica, hydrated | Hi Sil 233 | | 1.95 | 0.02 | 7.3 |
| silica, fumed | Cab-O-Sil | | 2.14 | 0.015–0.020 | 4.5–6.0 |

A lubricant can also be employed in the blend composition at a concentration level of less than about 20 parts by weight per 100 parts by weight of the styrene/ethylene/butylene-styrene block copolymer, and more preferably at less than about 15. The lubricants of the present instant invention are non-polar paraffinic hydrocarbon waxes having a softening point of about 135° F. to about 220° F., more preferably 150° F. to 200° F., wherein the wax has a number average molecular weight of about 100 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as additives to the blend compositions wherein the reinforcing filler is selected from the group consisting essentially of silica, carbon black, or calcium silicate and mixtures therein. These reinforcing agents are generally characterized as having particle sizes below 0.1 microns and oil absorption about about 100. These reinforcing fillers are incorporated in the blend composition at about less than 100 parts by weight per 100 parts by weight of the styrene-ethylene/butylene-styrene block copolymer, more preferably at less than about 50.

DETAILED DESCRIPTION

The advantages of both the rheological and physical properties of the blend composition of the present invention can be more readily appreciated by reference to the following examples and tables. Unless otherwise specified, all measurements are in parts per hundred by weight.

EXAMPLE 1

Sulfonation of a EPDM backbone of 40 Mooney at 100° C., 50 wt. % ethylene and 5 wt. % ENB (Royalene 521) at a level of 20 meq of —SO₃H. Neutralization is affected by barium hydroxide. The product is designated as TP-342. The sulfonation was done according to the procedure of U.S. Pat. No. 3,836,511, which is herein incorporated by reference.

EXAMPLE 2

The barium salt of sulfonated EPDM, TP-342 of Example 1 was blended with a styrene-ethylene/butylene-styrene block copolymer, Kraton G-1650 in the following formulations:

| | 2-1 | 2-2 | 2-3 |
| --- | --- | --- | --- |
| TP-342 | 50 | 100 | — |
| Kraton G-1650 | 50 | — | 100 |
| Polypropylene, Exxon CD-460 | 40 | 40 | 40 |
| Oil, Tufflo 6056 | 80 | 80 | 80 |
| Zinc Acetate | 2 | 4 | — |
| Stabilizer, Irganox 1010 | 0.5 | 0.5 | 0.5 |

The blending was done in an intensive batch mixer (Banbury mixer) by adding the rubbers first and then oil powders and polypropylene. Mixing was conducted for about 5 to 10 minutes and material was removed from the mixer at about 190° C. Zinc acetate is used as a melt flow improver for the sulfonated EPDM elastomer. Samples were prepared by injection molding using a reciprocating screw injection molding machine with a flat temperature profile of 220° C.

Th melt flow and physical properties for injection molded samples of the above compounds were:

| | ASTM | 2-1 | 2-2 | 2-3 |
| --- | --- | --- | --- | --- |
| Spiral flow, cm | | 29.1 | 21.0 | 34.7 |
| Physical Properties: At 25° C. | | | | |
| Shore A Hardness | D-2240 | 66 | 72 | 70 |
| 100% Modulus, psi | D-412 | 420 | 530 | 470 |
| Tensile Strength, psi | and | 600 | 590 | 940 |
| Elongation at break, % | D-638 | 380 | 210 | 710 |
| Compression set (dry), % | | 28 | 26 | 19 |
| Compression set (wet), % | | 27 | 38 | 16 |
| At 70° C. | D-395 | | | |
| Compression set (dry), % | | 88 | 69 | 96 |
| Compression set (wet), % | | 92 | 89 | 94 |
| At 120° C. | | | | |
| Tensile strength, psi | (D-412 & D-638) | 116 | 230 | 100 |

This example shows an improvement in flow for the elastomer blend (2-1) over sulfonated EPDM (2-2), and improvements in dry compression set at 70° C. and tensile strength at 120° C. of the blend over the styrene block copolymer (2-1 vs 2-3). The blend, 2-1, is also a softer material than either 2-2 or 2-3 both in Shore A Hardness and 100% modulus. Also, wet compression set at 25° C. of 2-1 is better than that of 2-2.

EXAMPLE 3

The barium salt of sulfonated EPDM, TP-342 of Example 1 was blended with a styrene-ethylene/butylene-styrene block copolymer compound, Kraton G-

2705, in a Banbury intensive batch mixer and the mixing procedure was as in Example 2.

|  | 3-1 | 3-2 | 3-3 |
|---|---|---|---|
| Kraton G-2705 | 94 | 220 | 510 |
| TP-342 | 100 | 100 | 100 |
| Polypropylene, Exxon CD-460 | 40 | 40 | 40 |
| Oil, Tufflo 6056 | 80 | 80 | 80 |
| Low MW polypropylene* | 5 | 5 | 5 |
| Stabilizer, Irganox 1010 | 0.5 | 0.5 | 0.5 |

*Amopol, polyropene C-175

The level of the Kraton G-2705 is increasing from formulation 3-1 to 3-3 while the level of the other ingredients are kept at the same relative level to that of the sulfonated EPDM, TP-342, which is decreasing from formulation 3-1 to 3-3.

The properties for injection molded samples of these formulations and those of the injection molded Kraton G-2705 compound, prepared and tested as in Example 2, were:

|  | 3-1 | 3-2 | 3-3 | Kraton G 2705 |
|---|---|---|---|---|
| Spiral flow, cm | 20.4 | 22.2 | 19.0 | 26.6 |
| Physical Properties: |  |  |  |  |
| At 25° C. |  |  |  |  |
| Shore A hardness | 68 | 67 | 65 | 60 |
| 100% Modulus, psi | 500 | 410 | 410 | 330 |
| Tensile strength, psi | 710 | 660 | 650 | 600 |
| Elongation at break, % | 570 | 620 | 610 | 580 |
| Compression set (dry) % | 26 | 25 | 25 | 20 |
| Compression set (wet), % | 43 | 39 | 33 | 21 |
| At 70° C. |  |  |  |  |
| Compression set (dry), % | 62 | 58 | 52 | 43 |
| Compression set (set), % | 81 | 76 | 69 | 49 |
| At 120° C. |  |  |  |  |
| Tensile strength, psi | 220 | 190 | 140 | 86 |

This example shows that addition of a sulfonated-EPDM polymer to a styrene block copolymer compound can improve tensile strength, particularly at higher temperature while maintaining good spiral flow.

What is claimed is:

1. An elastomeric composition which comprises
   (a) a styrene-ethylene/butylene-styrene block copolymer;
   (b) about 10 to about 400 parts by weight of a neutralized sulfonated EPDM terpolymer per 100 parts by weight of the styrene-ethylene/butylene-styrene block copolymer, said sulfonated EPDM terpolymer being derived from an EPDM terpolymer having an $\overline{M}n$ of about 10,000 to about 200,000, a Mooney viscosity [ML, 1+8] 212° F./and about 40 to about 75 wt. % of ethylene, of about 10 to about 53 wt. % of propylene and about 1 to about 10 wt. % of a conjugated diene;
   (c) about 5 to about 180 parts by weight of an isotactic polypropylene homopolymer per 100 parts by weight of the styrene-ethylene/butylene-styrene block copolymer; and
   (d) about 5 to about 300 parts by weight of a non-polar backbone process oil per 100 parts by weight of the styrene-ethylene/butylene-styrene block copolymer.

2. A composition according to claim 1, further including less than about 30 parts by weight of a preferential plasticizer per 100 parts by weight of the neutralized sulfonated EPDM terpolymer, wherein said preferential plasticizer is a metallic salt of a carboxylic acid.

3. A composition according to claim 2, wherein said neutralized sulfonated EPDM terpolymer has about 10 to about 100 meq. sulfonate groups per 100 grams of said neutralized sulfonated EPDM terpolymer, such sulfonate groups being at least 95% neutralized.

4. A composition according to claim 3, wherein said sulfonate groups are neutralized with a counterion being selected from the group consisting of ammonium, antimony, aluminum, lead and Groups I-A, II-A, I-B and II-B of the Periodic Table of Elements and mixtures thereof.

5. A composition according to claim 3, wherein said EPDM terpolymer consists of about 40 to about 75 wt. % of ethylene, of about 10 to about 53 wt. % of propylene and of about 1 to about 10 wt. % of a non-conjugated diene.

6. A composition according to claim 1, wherein said nonconjugated diene is selected from the group consisting of 1,4-hexadiene, dicyclopentadiene, alkylidene substituted norbornenes, alkenyl substituted norbornenes and tetrahydroindenes.

7. A composition according to claim 1, wherein said nonconjugated diene is 5-ethylidene-2-norbornene.

8. A composition according to claim 2, further including a filler being selected from the group consisting of clay, talc, and calcium carbonate, and mixtures thereof.

9. A composition according to claim 2, wherein said non-polar process oil is selected from the group consisting of paraffinic, naphthenic and aromatics and mixtures thereof, said non-polar process oil having an $\overline{M}n$ of about 400 to about 1000.

10. A composition according to claims 1, 2 or 8, further including a reinforcing filler at a concentration level of about less than 50 parts by weight per 100 parts by weight of said styrene-ethylene/butylene-styrene block copolymer.

11. A composition according to claim 2, further including an amorphous polypropylene.

12. A composition according to claim 2, wherein preferential plasticizer is zinc acetate.

* * * * *